(12) United States Patent
Ichikawa et al.

(10) Patent No.: US 12,420,942 B2
(45) Date of Patent: Sep. 23, 2025

(54) AIRCRAFT

(71) Applicant: HONDA MOTOR CO., LTD., Tokyo (JP)

(72) Inventors: Azuki Ichikawa, Wako (JP); Yuichi Fukuchi, Wako (JP); Hikari Hirayanagi, Wako (JP); Takuya Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/621,710

(22) Filed: Mar. 29, 2024

(65) Prior Publication Data
US 2024/0327016 A1    Oct. 3, 2024

(30) Foreign Application Priority Data
Mar. 30, 2023 (JP) .................. 2023-055319

(51) Int. Cl.
*B64D 33/04* (2006.01)
*B64D 33/10* (2006.01)

(52) U.S. Cl.
CPC ............. *B64D 33/04* (2013.01); *B64D 33/10* (2013.01)

(58) Field of Classification Search
CPC ..... B64C 21/01; B64C 21/04; B64C 29/0016; B64C 29/0025; F01N 2260/02; F01N 2270/02; B64D 27/00; B64D 27/02; B64D 27/08; B64D 27/14; B64D 27/20; B64D 27/32; B64D 27/40; B64D 33/00; B64D 33/10
See application file for complete search history.

(56) References Cited

U.S. PATENT DOCUMENTS

| | | | |
|---|---|---|---|
| 3,907,219 A * | 9/1975 | Pharris | B64C 27/26 244/12.5 |
| 10,273,018 B2 | 4/2019 | Pantalone, III et al. | |
| 10,562,641 B2 | 2/2020 | Pantalone, III et al. | |
| 10,773,817 B1 * | 9/2020 | Brennen | B64D 33/02 |
| 12,158,103 B1 * | 12/2024 | Meslioui | F01N 13/002 |
| 2010/0065677 A1 * | 3/2010 | Ferrier | B64C 27/26 244/6 |
| 2016/0214710 A1 * | 7/2016 | Brody | B64C 27/26 |
| 2018/0281978 A1 * | 10/2018 | Beutin | F02K 1/52 |
| 2019/0186334 A1 * | 6/2019 | Dionne | F01P 3/20 |
| 2020/0309066 A1 * | 10/2020 | Ross | F02C 6/206 |

* cited by examiner

*Primary Examiner* — Joshua J Michener
*Assistant Examiner* — Cindi M Curry
(74) *Attorney, Agent, or Firm* — Rankin, Hill & Clark LLP

(57) ABSTRACT

The aircraft includes a fuselage, an engine disposed in the fuselage, an exhaust outlet provided at a tail of the fuselage for discharging exhaust gas from the engine to the outside, and a cruise rotor positioned rearward of the exhaust outlet and generating horizontal thrust on the fuselage. The exhaust outlet and the cruise rotor do not overlap each other when viewed from the direction in which the exhaust gas is discharged.

8 Claims, 5 Drawing Sheets

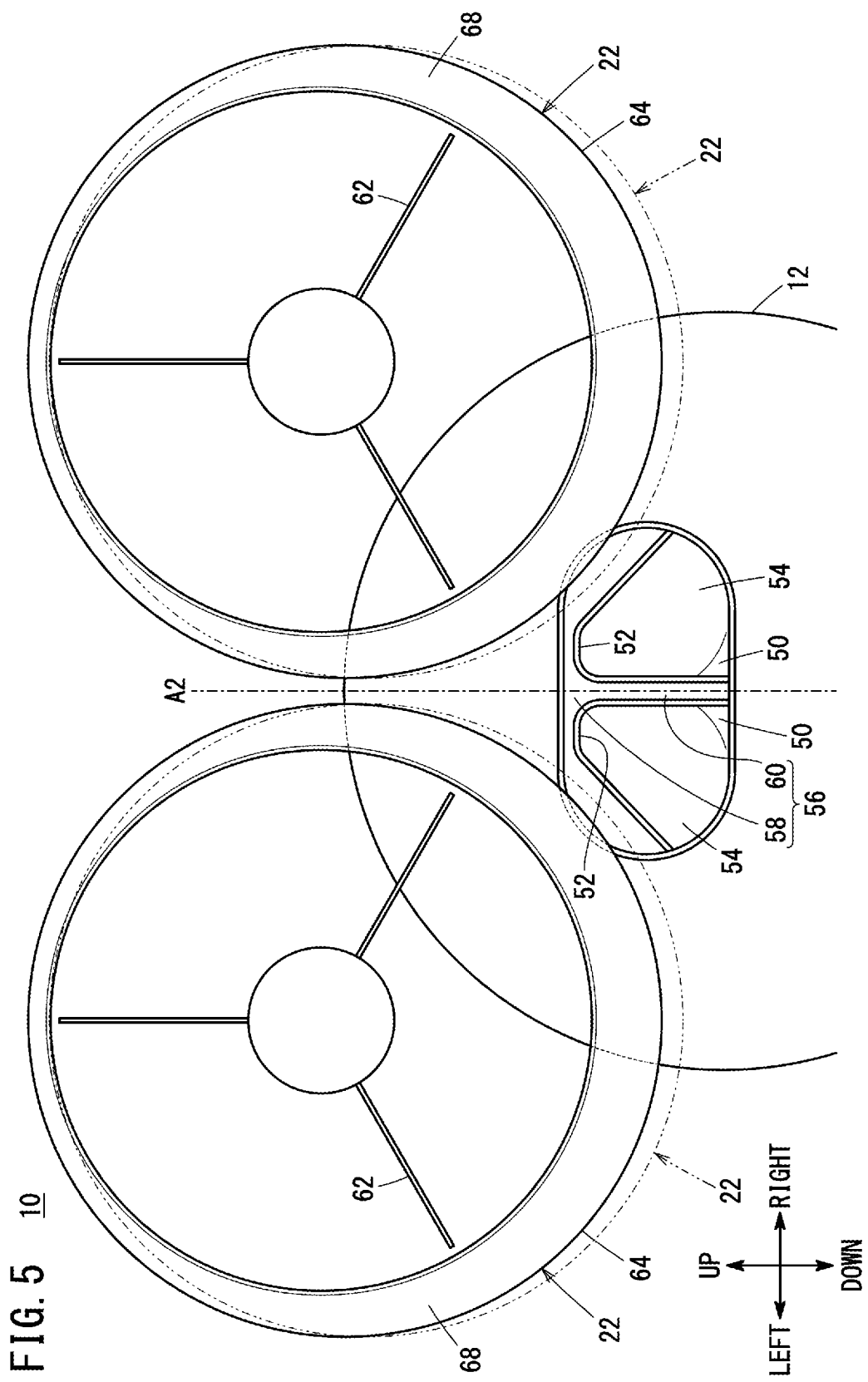

AIRCRAFT

CROSS-REFERENCE TO RELATED APPLICATIONS

This application is based upon and claims the benefit of priority from Japanese Patent Application No. 2023-055319 filed on Mar. 30, 2023, the contents of which are incorporated herein by reference.

BACKGROUND OF THE INVENTION

Field of the Invention

The present invention relates to an aircraft.

Description of the Related Art

In recent years, efforts toward realization of low-carbon or decarbonized society have been activated, and research and development have been conducted for reducing $CO_2$ emission and improving energy efficiencies also in aircrafts.

For example, U.S. Pat. No. 10,562,641 B2 discloses an aircraft on which a cruise rotor (propeller) is disposed behind an exhaust outlet for discharging exhaust gas from an engine.

SUMMARY OF THE INVENTION

A better aircraft is desired.

The present invention has the object of taking on the aforementioned challenge.

An aspect of the present invention is to provide an aircraft including: a fuselage; an engine provided in the fuselage; an exhaust outlet provided at a tail part of the fuselage and configured to discharge exhaust gas from the engine to an exterior of the fuselage; and a cruise rotor positioned rearward of the exhaust outlet of the fuselage and configured to generate thrust in a horizontal direction on the fuselage, wherein the exhaust outlet and the cruise rotor do not overlap each other when viewed from a direction in which the exhaust gas is discharged.

Another aspect of the present invention is to provide an aircraft including: a fuselage; an engine provided in the fuselage; an exhaust outlet provided at a tail part of the fuselage and configured to discharge exhaust gas from the engine to the exterior of the fuselage; and a cruise rotor positioned rearward of the exhaust outlet of the fuselage and configured to generate thrust in a horizontal direction on the fuselage, wherein the exhaust outlet and the cruise rotor are arranged so as not to overlap each other in a rear view of the fuselage.

According to the present invention, it is possible to provide a desirable aircraft.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a view of the aircraft from a direction in which exhaust gas is discharged.

DETAILED DESCRIPTION OF THE INVENTION

If an exhaust outlet and a cruise rotor are simply arranged, the cruise rotor may be excessively heated by the heat of exhaust gas discharged from the exhaust outlet. As a result of intensive research, the inventors of the present application have arrived at an aircraft to be described below.

Figure 1:
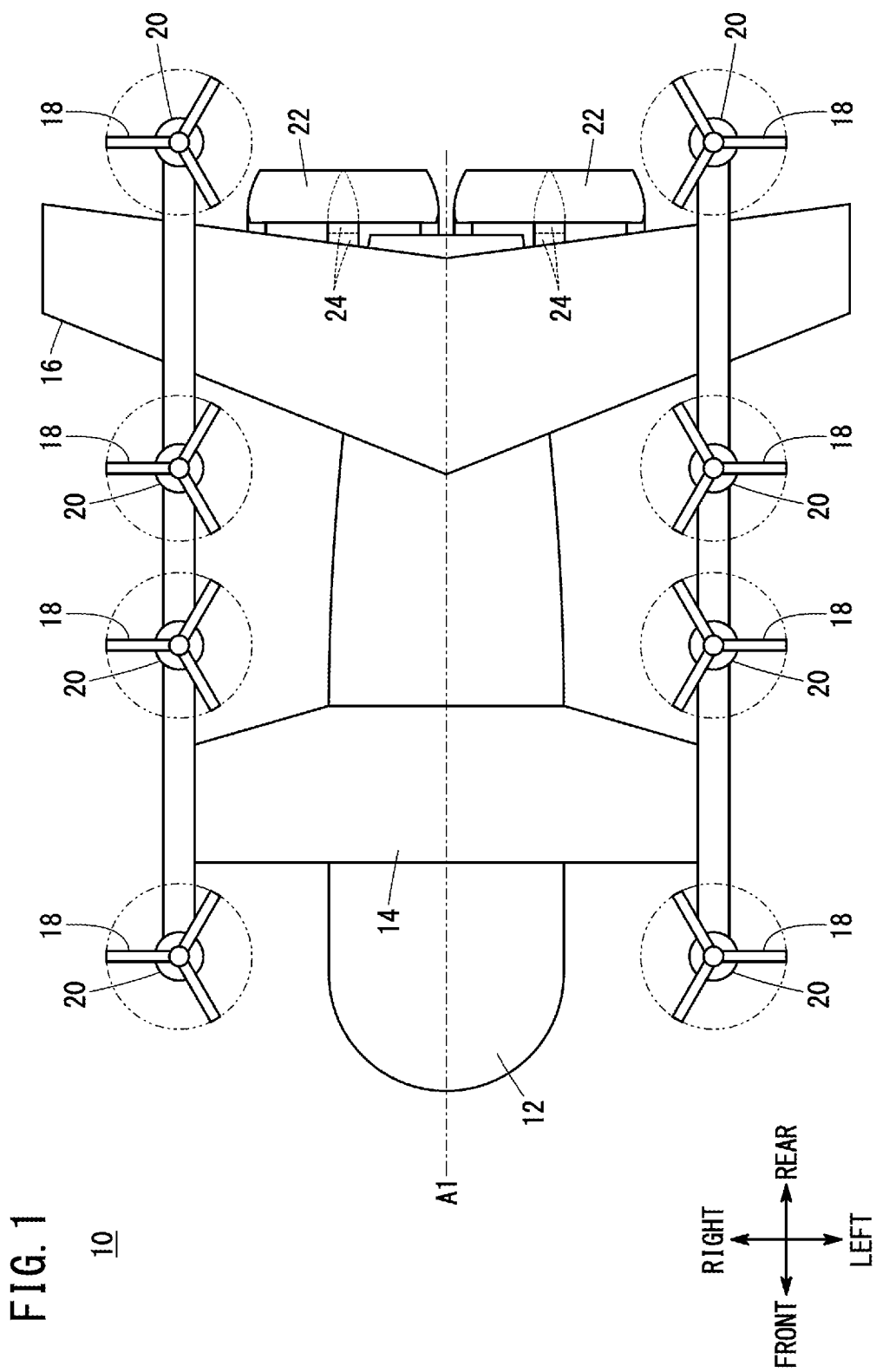
FIG. 1 is a schematic view of an aircraft according to an embodiment of the present invention.

An aircraft 10 according to an embodiment of the present invention will be described below with reference to the drawings. As shown in FIG. 1, the aircraft 10 according to the present embodiment is, for example, an electric vertical takeoff and landing (eVTOL) aircraft.

The aircraft 10 has a fuselage 12, a front wing 14, a rear wing 16, eight VTOL rotors 18, eight VTOL motors 20, two cruise rotors 22, and four cruise motors 24. The fuselage 12 extends in the front-rear direction of the aircraft 10. The tail part of the fuselage 12 decreases in diameter aft (see FIGS. 1 and 2).

The front wing 14 is attached to the fuselage 12 at a portion forward of the center of the fuselage in the front-rear direction. The rear wing 16 is provided at the tail part of the fuselage 12. The rear wing 16 is attached to the upper end of the fuselage 12. The rear wing 16 extends in the left-right direction of the fuselage 12.

The VTOL rotors 18 generate upward thrust on the aircraft 10. One VTOL motor 20 is connected to each VTOL rotor 18. The VTOL motors 20 are electrical motors for rotating the VTOL rotors 18. The cruise rotors 22 generate thrust in the horizontal direction on the aircraft 10. Two cruise motors 24 are connected to each cruise rotor 22. The cruise motors 24 are electrical motors for rotating the cruise rotors 22.

The number and arrangement of the VTOL rotors 18, the VTOL motors 20, the cruise rotors 22, and the cruise motors 24 can be set as desired. Only one cruise motor 24 may be connected to each cruise rotor 22. In other words, the number of cruise motors 24 may be two in total, one for each of the left and right cruise rotors 22.

Figure 2:
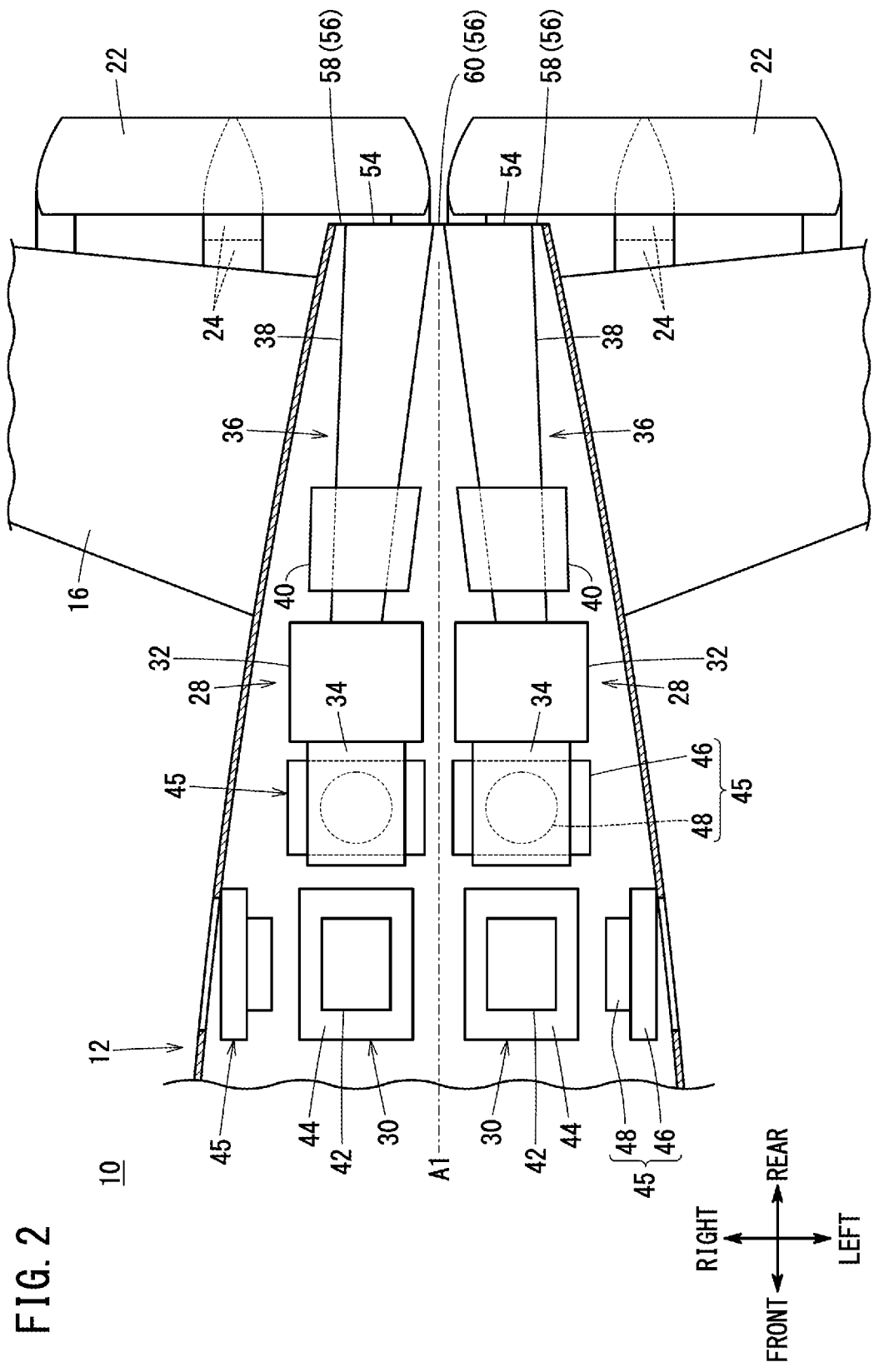
FIG. 2 is a plan view of the aircraft with a partial cross-sectional view.

As shown in FIG. 2, a pair of power generation modules 28 and a pair of electronic equipment 30 are disposed inside the fuselage 12. The pair of power generation modules 28 are arranged symmetrically with respect to the center line A1 in the left-right direction of the fuselage 12. The center line A1 extends in the front-rear direction of the fuselage 12. The pair of power generation modules 28 may not be arranged symmetrically with respect to the center line A1.

Each of the power generation modules 28 includes an engine 32, a rotating electric machine 34, and an exhaust device 36. The engine 32, for example, is a gas turbine engine. The engine 32 generates high-temperature combustion gas by burning fuel, and drives a turbine (not shown) by the combustion gas. The engine 32 is not limited to a gas turbine engine, and may be an appropriate internal-combustion engine or an external-combustion engine.

The rotating electric machine 34 is connected to the engine 32. The rotating electric machine 34 functions as, for example, a generator that generates electric power by being driven by the engine 32. Further, the rotating electric machine 34 functions as, for example, a motor for rotating a compressor (not shown) at the time of starting the engine 32. The rotating electric machine 34 is arranged forward of the first engine 32 in the fuselage 12.

The exhaust device 36 is connected to the engine 32. The exhaust device 36 guides the high-temperature exhaust gas discharged from the engine 32 to the exterior of the fuselage 12. The exhaust device 36 is arranged rearward of the engine 32 in the fuselage 12.

The exhaust device 36 includes an exhaust pipe 38 and a gas mixing section 40. The exhaust pipe 38 is a diffuser extending from the engine 32 toward the rear of the fuselage 12. A rear end of the exhaust pipe 38 is positioned at a rear end of the fuselage 12. The gas mixing section 40 is connected to the exhaust pipe 38. The high-temperature exhaust gas flowing through the exhaust pipe 38 is mixed with cooling gas in the mixing section 40. The cooling gas is, for example, outside air that has flowed through a radiator (not shown). In this case, the outside air and a cooling medium for cooling the rotating electric machine 34 exchange heat at the radiator. Even after being heated by the heat exchange, the outside air is still at a temperature sufficiently lower than the exhaust gas. The cooling gas to be mixed with the exhaust gas is not limited to the outside air that has flowed through the radiator.

The pair of electronic equipment 30 are arranged symmetrically with respect to the center line A1. The pair of electronic equipment 30 are separated from each other in the left-right direction of the fuselage 12. The pair of electronic equipment 30 may not be arranged symmetrically with respect to the center line A1.

The electronic equipment 30 is provided with electronic devices. The electronic equipment 30 includes, for example, a power conversion device 42 and an electrical power device 44. The power conversion device 42 includes, for example, a plurality of inverters for driving the VTOL motors 20 and the cruise motors 24.

The electrical power device 44 is, for example, a junction box. The electrical power device 44 connects a power control unit (not shown) to a plurality of electrical loads. The power control unit converts AC electrical power generated by the rotating electric machine 34 into DC electrical power. The electrical loads include, for example, the VTOL motors 20, the cruise motors 24, and batteries and the like. The electrical loads may include an electronic device other than the VTOL motors 20, the cruise motors 24, and the batteries. The configuration of the electrical power device 44 can be set as appropriate.

Four cooling units 45 are arranged inside the fuselage 12. Each of the cooling units 45 includes a radiator 46 and a cooling fan 48. A cooling medium flows through the radiator 46. The cooling medium flows through the radiator 46 and cools two VTOL motors 20, one cruise motor 24 and the power conversion device 42. The cooling fan 48 supplies air outside the fuselage 12 to the radiator 46 and deliver the air to the interior of the fuselage 12. The number and arrangement of the cooling units 45 can be set as desired.

Figure 3:
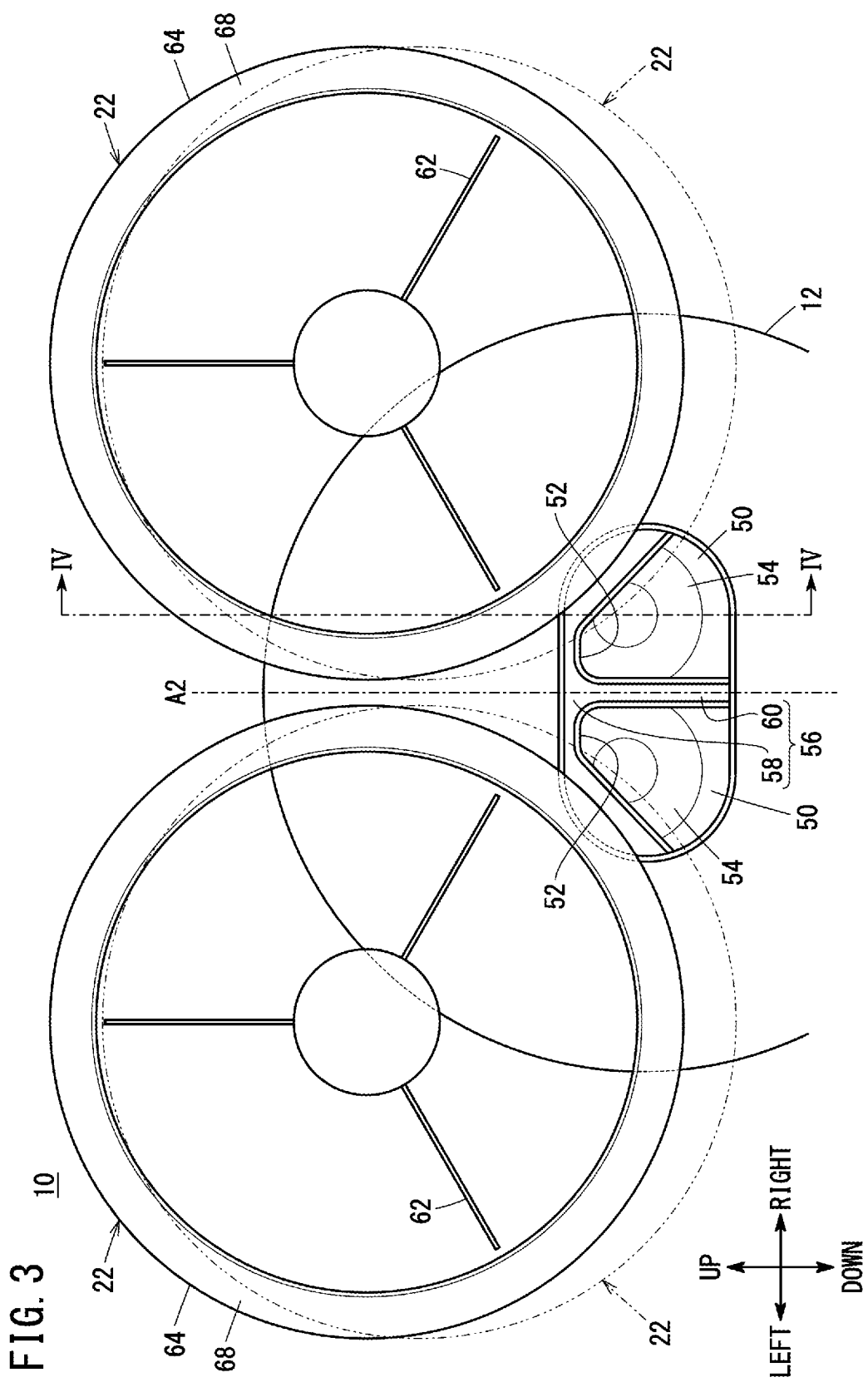
FIG. 3 is a rear view of the aircraft.
Figure 4:
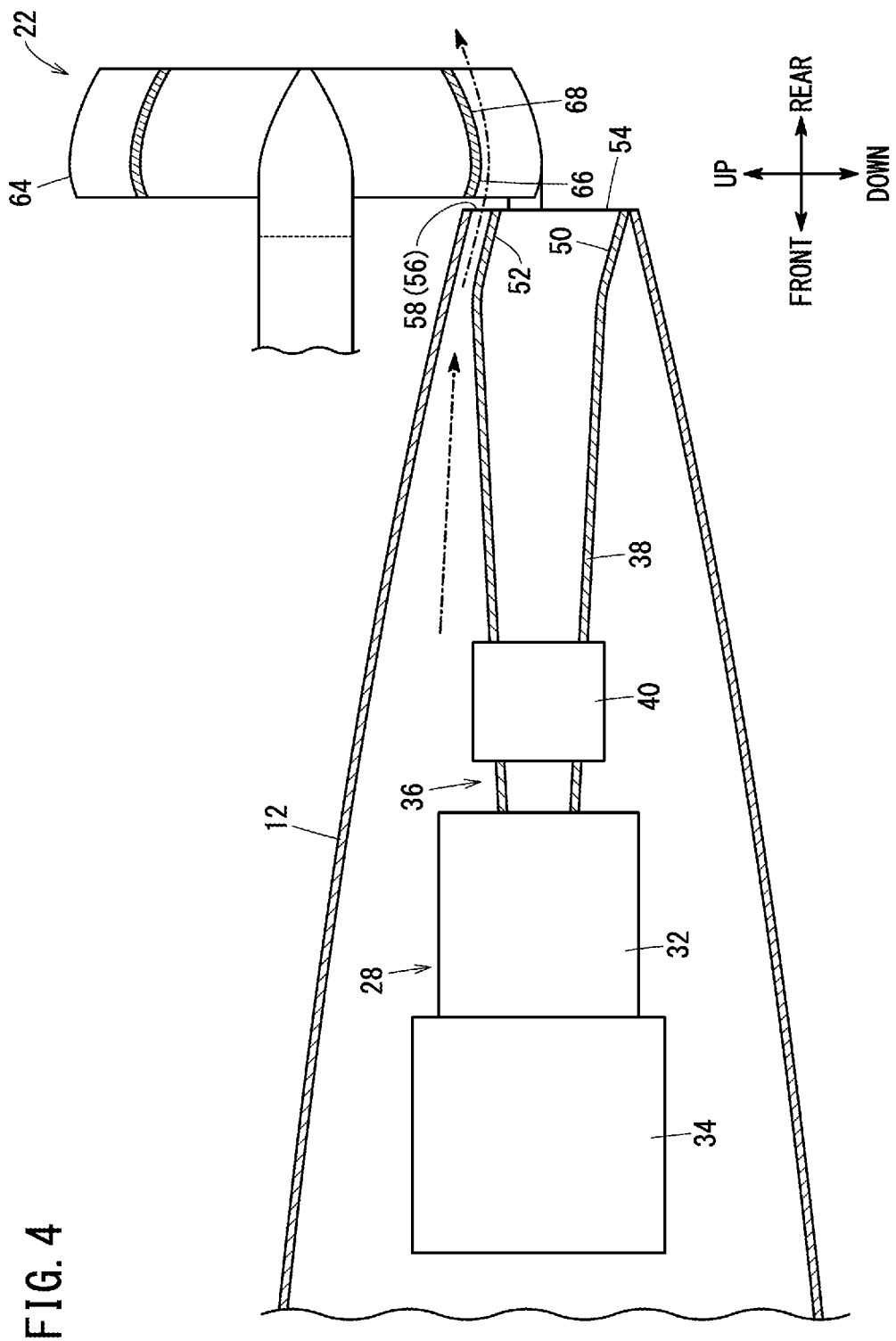
FIG. 4 is a cross-sectional view taken along line IV-IV of FIG. 3.

As shown in FIGS. 3 and 4, the inner surface of the exhaust pipe 38 includes a lower curved surface 50 and an upper curved surface 52 in the rear end portion. As shown in FIG. 4, the lower curved surface 50 curves to incline downward toward the rear of the fuselage 12 and slopes away from the axis of the exhaust pipe 38. The upper curved surface 52 curves to incline downward toward the rear of the fuselage 12 and slopes to the axis of the exhaust pipe 38. The exhaust pipe 38 has an exhaust outlet 54 for discharging high-temperature exhaust gas discharged from the engine 32 to the outside of the fuselage 12. The exhaust outlet 54 is directed obliquely downward and rearward of the fuselage 12. That is, the exhaust pipe 38 discharges the exhaust gas obliquely downward and rearward of the fuselage 12. The pair of exhaust outlets 54 are arranged symmetrically with respect to the center line A1 of the fuselage 12 (see FIG. 3).

As shown in FIGS. 2 to 5, an air discharge orifice 56 is provided at the rear end of the fuselage 12. The air that has been delivered into the interior of the fuselage 12 by the four cooling fans 48 are discharged to the outside of the fuselage 12 through the air discharge orifice 56. That is, the air discharged from the air discharge orifice 56 has a temperature lower than that of the exhaust gas. The air discharge orifice 56 is adjacent to the outer side of the exhaust outlets 54.

As shown in FIGS. 3 and 5, the air discharge orifice 56 includes a first discharge portion 58 and a second discharge portion 60. The first discharge portion 58 is positioned above the pair of exhaust outlets 54. The first discharge portion 58 is positioned outside the upper curved surface 52. The first discharge portion 58 is formed between the rear end of the body of the fuselage 12 and the exhaust pipes 38. The second discharge portion 60 is positioned between the pair of exhaust outlets 54. The second discharge portion 60 is provided between the rear end portions of the pair of exhaust pipes 38.

The pair of cruise rotors 22 are positioned rearward of the exhaust outlets 54 of the fuselage 12 (see FIGS. 1 and 2). As shown in FIG. 3, the pair of cruise rotors 22 are disposed symmetrically with respect to a center line A2 extending in the up-down direction of the fuselage 12. The pair of cruise rotors 22 are disposed so as to overlap the fuselage 12 in a rear view of the fuselage 12. The pair of cruise rotors 22 are disposed so as to overlap with a tail part of the fuselage 12 in a rear view of the fuselage 12. Thus, the thrust generated by the pair of cruise rotors 22 can be suitably applied to the fuselage 12. The pair of cruise rotors 22 are close to each other.

Each of the cruise rotors 22 includes a propeller 62 and a duct 64. The propeller 62 is rotated by the cruise motor 24. The duct 64 is made of, for example, a lightweight resin material. Examples of the resin material include epoxy carbon fiber reinforced plastics (CFRP). The duct 64 may be degraded when being directly blown by the exhaust gas. The material of the duct 64 is not limited to a resin material, and may be a metal material. The duct 64 is formed in a tubular shape. The duct 64 covers the propeller 62 from the outside in the radial direction.

The outer peripheral surface of the duct 64 bulges radially outward in an arc shape. In other words, as shown in FIG. 4, the outer peripheral surface of the duct 64 includes a first surface portion 66 and a second surface portion 68. The first surface portion 66 is a portion where the outer diameter of the duct 64 increases rearward in the front-rear direction of the fuselage 12. The second surface portion 68 is a portion where the outer diameter of the duct 64 decreases rearward in the front-rear direction of the fuselage 12. The second surface portion 68 is positioned rearward of the first surface portion 66 in the front-rear direction of the fuselage 12. The first surface portion 66 is directly continuous with the second surface portion 68.

FIG. 5 is a view of the aircraft 10 from a direction in which exhaust gas is discharged. As shown in FIG. 5, the exhaust outlets 54 and the cruise rotors 22 do not overlap each other when viewed from the direction in which the exhaust gas is discharged. FIG. 3 is a rear view of aircraft 10. As shown in FIG. 3, the exhaust outlets 54 and the cruise rotors 22 are arranged so as not to overlap each other in a rear view of the fuselage 12. The first discharge portion 58 of the air discharge orifice 56 and the ducts 64 overlap each other in a rear view of the fuselage 12. The outer peripheral surfaces of the ducts 64 guide the air discharged from the air discharge orifice 56.

The cruise rotors 22 may be disposed at positions depicted by imaginary lines in FIGS. 3 and 5. In this case, as shown by the imaginary lines in FIG. 3, the exhaust outlets 54 and the cruise rotors 22 overlap each other in the rear view of the fuselage 12. On the other hand, as shown by the imaginary lines in FIG. 5, the exhaust outlets 54 and the cruise rotors 22 do not overlap each other when viewed from the direction in which the exhaust gas is discharged. The first discharge portion 58 of the air discharge orifice 56 and the cruise rotors 22 overlap each other as viewed in the direction in which the exhaust gas is discharged.

In the aircraft 10 described above, the high-temperature exhaust gas discharged from the engine 32 is cooled by the cooling gas introduced from the gas mixing section 40. Thereafter, the exhaust gas passes through the exhaust pipes 38 and is discharged from the exhaust outlets 54 obliquely downward and rearward of the fuselage 12. The exhaust gas discharged from the exhaust outlets 54 is not discharged toward the ducts 64.

The air taken into the interior of the fuselage 12 by the four cooling fans 48 flows through the interior of the fuselage 12 and then is discharged from the air discharge orifice 56 of the fuselage 12 obliquely downward and rearward. The air discharged from the air discharge orifice 56 flows between the exhaust gas discharged from the exhaust outlets 54 and the ducts 64 of the cruise rotors 22. That is, the discharged air functions as an air curtain for preventing the exhaust gas from contacting the cruise rotors 22. Therefore, the heat of the exhaust gas is suitably prevented from being transmitted to the cruise rotors 22.

As shown in FIG. 4, the discharged air flows while being guided by the outer peripheral surfaces of the ducts 64. In other words, the discharged air flows along the first surface portion 66 toward the second surface portion 68 of the outer peripheral surface in each of the ducts 64. In this case, when the discharged air flows along the second surface portion 68, the flow passage cross-sectional areas of the discharged air and the exhaust gas are increased. That is, the second surface portion 68 of each duct 64 functions as a diffuser. Thus, the exhaust gas can be smoothly discharged to the outside of the fuselage 12.

According to the present embodiment, the exhaust outlets 54 and the cruise rotors 22 do not overlap each other when viewed in the direction in which the exhaust gas is discharged, and therefore, the exhaust gas discharged from the exhaust outlets 54 is prevented from flowing toward the cruise rotors 22. That is, according to the present embodiment, the exhaust outlets 54 and the cruise rotors 22 can be arranged in a suitable manner. As described above, according to the present embodiment, it is possible to provide a desirable aircraft 10.

The aircraft 10 is not limited to the configuration described above. An air introduction orifice for introducing air outside the fuselage 12 into the air discharge orifice 56 may be provided at the tail part of the fuselage 12. In this case, at least some of the four cooling units 45 described above may be omitted.

In relation to the above-described disclosure, the following supplementary notes are further disclosed.

Supplementary Note 1

The aircraft (10) including: the fuselage (12); an engine (32) provided in the fuselage; an exhaust outlet (54) provided at a tail part of the fuselage and configured to discharge exhaust gas from the engine to the exterior of the fuselage; and the cruise rotor (22) positioned rearward of the exhaust outlet of the fuselage and configured to generate thrust in the horizontal direction on the fuselage, wherein the exhaust outlet and the cruise rotor do not overlap each other when viewed from the direction in which the exhaust gas is discharged.

According to such a configuration, the exhaust outlet and the cruise rotor do not overlap each other when viewed from the direction in which the exhaust gas is discharged, and thus it is possible to prevent the exhaust gas discharged from the exhaust outlet from flowing toward the cruise rotor. That is, according to such a configuration, the exhaust outlet and the cruise rotor can be suitably arranged. In this way, a desired aircraft can be provided.

Supplementary Note 2

In the aircraft according to Supplementary Note 1, the exhaust outlet and the cruise rotor may not overlap each other in the rear view of the fuselage.

According to this configuration, the exhaust gas can be further prevented from flowing toward the cruise rotor.

Supplementary Note 3

In the aircraft according to Supplementary Note 1 or 2, the air discharge orifice (56) configured to discharge air having a temperature lower than that of the exhaust gas may be arranged adjacent to an outer surface of the exhaust outlet at the tail part of the fuselage.

In this manner, the air discharged from the air discharge orifice flows between the exhaust gas discharged from the exhaust outlet and the cruise rotor. Thus, the discharged air can prevent the heat of the exhaust gas from being transmitted to the cruise rotor.

Supplementary Note 4

In the aircraft according to Supplementary Note 3, a part of the cruise rotor and the air discharge orifice may overlap each other in the rear view of the fuselage.

According to such a configuration, the thrust generated by the cruise rotor can be suitably applied to the fuselage while the discharged air can prevent the cruise rotor from being blown by the exhaust gas.

Supplementary Note 5

In the aircraft described in Supplementary Note 4, the cruise rotor may include the rotary propeller (62) and the duct (64) in the tubular shape covering the propeller from the radially outer side, and the duct and the air discharge orifice may overlap each other in the rear view of the fuselage.

According to such a configuration, it is possible to prevent the propeller from being blown by the exhaust air.

Supplementary Note 6

In the aircraft according to Supplementary Note 5, the outer peripheral surface of the duct may be configured to guide the air discharged from the air discharge orifice.

According to such a configuration, the duct can be made to function as a diffuser, and therefore, the exhaust gas can be smoothly discharged to the outside of the fuselage.

Supplementary Note 7

The aircraft according to Supplementary Note 3 may further include: the radiator (46) configured to cool at least one of the motor (20, 24) that generates thrust on the fuselage or the power conversion device (42) that supplies power to the motor; and the cooling fan (48) configured to supply air outside the fuselage to the radiator and deliver the air to an interior of the fuselage, and the air discharge orifice may be configured to discharge the air that has been delivered into the interior of the fuselage by the cooling fan.

According to such a configuration, air can be discharged from the air discharge orifice by utilizing the cooling fan provided for cooling at least one of the motor and the power conversion device. That is, an additional fan or the like is not required for discharging air from the air discharge orifice. Therefore, the configuration of the aircraft can be simplified.

Supplementary Note 8

In the aircraft according to any one of Supplementary Notes 1 to 7, the exhaust outlet may be configured to discharge the exhaust gas obliquely downward and rearward of the fuselage.

According to this configuration, the exhaust gas can be further prevented from directly flowing to the cruise rotor.

Supplementary Note 9

In the aircraft according to any one of Supplementary Notes 1 to 8, the exhaust outlet may be disposed in pairs in the left-right direction of the fuselage, and the cruise rotor may be disposed in pairs in the left-right direction of the fuselage.

According to such a configuration, the thrust generated by the cruise rotors can be applied to the fuselage in a well-balanced manner.

Supplementary Note 10

The aircraft including: the fuselage; the engine provided in the fuselage; the exhaust outlet provided at the tail part of the fuselage and configured to discharge exhaust gas from the engine to the exterior of the fuselage; and the cruise rotor positioned rearward of the exhaust outlet of the fuselage and configured to generate thrust in the horizontal direction on the fuselage, wherein the exhaust outlet and the cruise rotor are arranged so as not to overlap each other in the rear view of the fuselage.

According to such a configuration, the exhaust outlet and the cruise rotor do not overlap each other in the rear view of the fuselage, and thus the cruise rotor can be prevented from being blown by the exhaust gas discharged from the exhaust outlet. That is, the exhaust outlet and the cruise rotor can be arranged in a suitably manner. In this way, a desired aircraft can be provided.

Moreover, it should be noted that the present invention is not limited to the embodiments described above, but a variety of configurations may be adopted therein without departing from the essence and gist of the present invention.

The invention claimed is:

1. An aircraft comprising:
a fuselage;
an engine provided in the fuselage;
an exhaust outlet provided at a tail part of the fuselage and configured to discharge exhaust gas from the engine to an outside of the fuselage; and
a cruise rotor positioned rearward of the exhaust outlet of the fuselage and configured to generate thrust in a horizontal direction on the fuselage, wherein
the exhaust outlet and the cruise rotor do not overlap each other when viewed from a direction in which the exhaust gas is discharged,
an air discharge orifice configured to discharge air having a temperature lower than a temperature of the exhaust gas is arranged externally adjacent to the exhaust port at the tail part of the fuselage, and
a part of the cruise rotor and the air discharge orifice overlap each other in a rear view of the fuselage.

2. The aircraft according to claim 1, wherein the exhaust outlet and the cruise rotor do not overlap each other in a rear view of the fuselage.

3. The aircraft according to claim 1, wherein the cruise rotor includes:
a rotary propeller; and
a duct in a tubular shape covering the propeller from a radially outer side, and
wherein the duct and the air discharge orifice overlap each other in the rear view of the fuselage.

4. The aircraft according to claim 3, wherein an outer peripheral surface of the duct is configured to guide the air discharged from the air discharge orifice.

5. The aircraft according to claim 1, further comprising, in an interior of the fuselage:
a radiator configured to cool at least one of a motor that generates thrust on the fuselage or a power conversion device that supplies power to the motor; and
a cooling fan configured to supply air outside the fuselage to the radiator and deliver the air to the interior of the fuselage,
wherein the air discharge orifice is configured to discharge the air that has been delivered to the interior of the fuselage by the cooling fan.

6. The aircraft according to claim 1, wherein the exhaust outlet is configured to discharge the exhaust gas obliquely downward and rearward of the fuselage.

7. The aircraft according to claim 1, wherein
the exhaust outlet is arranged in pairs in a left-right direction of the fuselage, and
the cruise rotor is arranged in pairs in the left-right direction of the fuselage.

8. An aircraft comprising:
a fuselage;
an engine provided in the fuselage;
an exhaust outlet provided at a tail part of the fuselage and configured to discharge exhaust gas from the engine to an exterior of the fuselage; and
a cruise rotor positioned rearward of the exhaust outlet of the fuselage and configured to generate thrust in a horizontal direction on the fuselage, wherein
the exhaust outlet and the cruise rotor are arranged so as not to overlap each other in a rear view of the fuselage,
an air discharge orifice configured to discharge air having a temperature lower than a temperature of the exhaust gas is arranged externally adjacent to the exhaust port at the tail part of the fuselage, and
a part of the cruise rotor and the air discharge orifice overlap each other in a rear view of the fuselage.

* * * * *